(12) United States Patent
Triano et al.

(10) Patent No.: US 11,138,624 B2
(45) Date of Patent: *Oct. 5, 2021

(54) METHOD AND SYSTEM FOR REAL-TIME OFFER OPTIMIZATION

(71) Applicant: MASTERCARD INTERNATIONAL INCORPORATED, Purchase, NY (US)

(72) Inventors: Kaitlin Triano, Greenwich, CT (US); Sruba De, Houston, TX (US); Joseph M. Zeltzer, Hoboken, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 181 days.

This patent is subject to a terminal disclaimer.

(21) Appl. No.: 16/434,303

(22) Filed: Jun. 7, 2019

(65) Prior Publication Data
US 2019/0287129 A1    Sep. 19, 2019

Related U.S. Application Data

(63) Continuation of application No. 14/896,076, filed as application No. PCT/US2015/050148 on Sep. 15, 2015, now Pat. No. 10,339,552.

(Continued)

(51) Int. Cl.
*G06Q 30/00* (2012.01)
*G06Q 30/02* (2012.01)
*G06Q 30/06* (2012.01)

(52) U.S. Cl.
CPC ........ *G06Q 30/0222* (2013.01); *G06Q 30/02* (2013.01); *G06Q 30/0211* (2013.01); *G06Q 30/0239* (2013.01); *G06Q 30/06* (2013.01)

(58) Field of Classification Search
None
See application file for complete search history.

(56) References Cited

U.S. PATENT DOCUMENTS 8,719,193 B1    5/2014  Iannace
10,339,552 B2 *  7/2019  Triano ................... G06Q 30/06

(Continued)

FOREIGN PATENT DOCUMENTS

EP      661654 A2 * 11/1994  ............. G06F 17/60
EP     0661654 A2    7/1995

(Continued)

OTHER PUBLICATIONS

• MasterCard. 2014 MasterCard Global Risk Conference: Asia Pacific. (Aug. 11, 2014). Retrieved online Jan. 30, 2021. https://na.eventscloud.com/file_uploads/f06c6b8252631b6cb8529bd3eb4d3318_APDAYTWOpresentationapprovedtopost.pdf (Year: 2014).*

(Continued)

*Primary Examiner* — James A Reagan
(74) *Attorney, Agent, or Firm* — Buchanan Ingersoll & Rooney PC

(57) ABSTRACT

A method for identifying and distributing offers includes: storing account profiles, each profile including data related to a transaction account including an account identifier and a plurality of transaction data entries, each including transaction data; receiving an offer request from a consumer entity, the request including a specific account identifier and geographic location; identifying a specific account profile that includes the specific account identifier; identifying offer parameters, the parameters being based on the geographic location and the transaction data included in the identified specific account profile; transmitting the offer parameters to a merchant entity; receiving offer data for a plurality of offers from the merchant entity based on the offer parameters; identifying a specific offer based on the offer data for the specific offer and the transaction data included in the specific account profile; and transmitting the offer data for the identified specific offer to the consumer entity.

17 Claims, 6 Drawing Sheets

Related U.S. Application Data

(60) Provisional application No. 62/050,396, filed on Sep. 15, 2014.

(56) References Cited

U.S. PATENT DOCUMENTS

| | | | |
|---|---|---|---|
| 2003/0233278 A1* | 12/2003 | Marshall | G06Q 30/0212 705/14.35 |
| 2004/0243468 A1* | 12/2004 | Cohagan | G06Q 30/0238 705/14.23 |
| 2007/0198354 A1* | 8/2007 | Senghore | G07F 17/3255 705/14.32 |
| 2008/0091518 A1 | 4/2008 | Eisenson et al. | |
| 2011/0078011 A1* | 3/2011 | Senghore | G06Q 30/0219 705/14.25 |
| 2011/0106698 A1* | 5/2011 | Isaacson | G06Q 30/06 705/41 |
| 2012/0078717 A1* | 3/2012 | Smith | G06Q 30/02 705/14.53 |
| 2012/0130790 A1 | 5/2012 | Lyons et al. | |
| 2013/0024242 A1 | 1/2013 | Villars et al. | |
| 2013/0030915 A1* | 1/2013 | Statler | G06Q 20/322 705/14.54 |
| 2013/0124283 A1* | 5/2013 | Kaulbach | G06Q 30/02 705/14.22 |
| 2013/0166332 A1* | 6/2013 | Hammad | G06Q 40/10 705/5 |
| 2013/0191213 A1* | 7/2013 | Beck | G06Q 30/0207 705/14.53 |
| 2014/0067533 A1 | 3/2014 | Gandhi | |
| 2014/0081726 A1 | 3/2014 | Cooke et al. | |
| 2014/0180767 A1 | 6/2014 | Villars | |
| 2014/0207663 A1 | 7/2014 | Iannace | |
| 2014/0244376 A1 | 8/2014 | Wall | |
| 2014/0257920 A1 | 9/2014 | Gilman et al. | |

FOREIGN PATENT DOCUMENTS

| | | | | |
|---|---|---|---|---|
| KR | 20140031834 A | | 3/2014 | |
| WO | WO-2009023258 A2 | * | 2/2009 | ............. G06Q 30/02 |
| WO | WO-2009158590 A2 | * | 12/2009 | ........... G06Q 50/188 |

OTHER PUBLICATIONS

• The Wolfsberg Group. Wolfsberg Guidance on Sanctions Screening. (Jul. 15, 2014). Retrieved online Jan. 30, 2021. https://www.wolfsberg-principles.com/sites/default/files/wb/pdfs/Wolfsberg%20Guidance%20on%20Sanctions%20Screening.pdf (Year: 2014).*

• FATF Report. Money Laundering through Money Remittance and Currency Exchange Providers. (Jun. 2010). Retrieved online Jun. 2, 2021. https://rm.coe.int/fatf-report-money-laundering-through-money-remittance-and-currency-exc/16807150ad (Year: 2010).*

• Bogdan Batrinca & Philip C. Treleaven. Social media analytics: a survey of techniques, tools and platforms. (Jul. 26, 2014). Retrieved online Jun. 2, 2021. https://link.springer.com/article/10.1007/s00146-014-0549-4 (Year: 2014).*

U.S. Appl. No. 62/115,453, entitled "Method and System for Providing Insights to Merchants Based on Consumer Transaction History," filed Feb. 12, 2015, by Oran Cummins et al.

International Search Report and Written Opinion dated Jan. 20, 2016 in corresponding International Patent Application No. PCT/US2015/050148 (11 pages).

* cited by examiner

METHOD AND SYSTEM FOR REAL-TIME OFFER OPTIMIZATION

FIELD

The present disclosure relates to the identification and distribution of offers, specifically the use of transaction data to identify parameters for a consumer as requested by a consumer entity for use by a merchant entity to identify offers, and the selection thereof of a highly or most likely effective offer to provide to the consumer entity for presentation to the consumer.

BACKGROUND

Offers, such as coupons, discounts, advertisements, etc., are often used by merchants, manufacturers, retailers, and other entities to persuade a consumer to visit a merchant and make a purchase, either for the offered product or for some other good or service they have seen as a result of their visit. In order to increase the effectiveness of offers, and thereby increase the rate of return for distributing offers and providing associated discounts or deals, these entities often try to gain as much information about consumers as they can, and then select offers specifically selected for the consumer based on knowledge about the consumer and his or her interests.

However, many merchants lack enough information on consumers in order to properly target offers. As a result, merchants often use third party entities for distributing offers, such as offer providers, advertisers, and other entities (e.g., Yelp, Google Ads, Group-on, etc.) that make a significant effort to learn about consumers and set up distribution networks. By using such entities, merchants can have their offers distributed to suitable consumers, without having to gather and analyze consumer information themselves. However, both merchants and offer providers often lack additional information regarding opportune times for the distribution of offers. For example, offers may be distributed to a consumer at arbitrary times, including times when the consumer may be unable or unwilling to act on such an offer, thereby reducing effectiveness.

Existing technical systems for merchants and offer providers often lack the capability to identify an event that would serve as a suitable time for the distribution of an offer to a consumer. Additionally, merchant and offer provider systems lack information suitable for identifying what offer may be the most suitable for distribution to a consumer given the context of the triggering event. Thus, there is a need for a technical system that can intelligently identify suitable offers for a consumer at an opportune time and identify an ideal offer for distribution to the consumer using consumer transaction data that is unavailable to existing offer distribution systems.

SUMMARY

The present disclosure provides a description of systems and methods for facilitating identification and distribution of offers.

A method for facilitating identification and distribution of offers includes: storing, in an account database, a plurality of account profiles, wherein each account profile includes data related to a transaction account including at least an account identifier and a plurality of transaction data entries, each transaction data entry including data related to a payment transaction involving the related transaction account including transaction data; receiving, by a receiving device, an offer request from a consumer entity, wherein the offer request includes at least a specific account identifier and a geographic location; identifying, in the account database, a specific account profile where the included account identifier corresponds to the specific account identifier; identifying, by a processing device, two or more offer parameters, wherein the two or more offer parameters are based on at least the geographic location and the transaction data included in one or more transaction data entries included in the identified specific account profile; transmitting, by a transmitting device, at least the identified two or more offer parameters to a merchant entity; receiving, by the receiving device, offer data for a plurality of offers from the merchant entity, wherein each offer of the plurality of offers is based on at least the transmitted two or more offer parameters; identifying, by the processing device, a specific offer of the received plurality of offers based on at least the offer data for the specific offer and the transaction data included in one or more transaction data entries included in the identified specific account profile; and transmitting, by the transmitting device, at least the offer data for the identified specific offer to the consumer entity.

A system for facilitating identification and distribution of offers includes an account database, a receiving device, a processing device, and a transmitting device. The account database is configured to store a plurality of account profiles, wherein each account profile includes data related to a transaction account including at least an account identifier and a plurality of transaction data entries, each transaction data entry including data related to a payment transaction involving the related transaction account including transaction data. The receiving device is configured to receive an offer request from a consumer entity, wherein the offer request includes at least a specific account identifier and a geographic location. The processing device is configured to: identify, in the account database, a specific account profile where the included account identifier corresponds to the specific account identifier; and identify two or more offer parameters, wherein the two or more offer parameters are based on at least the geographic location and the transaction data included in one or more transaction data entries included in the identified specific account profile. The transmitting device is configured to transmit at least the identified two or more offer parameters to a merchant entity. The receiving device is further configured to receive offer data for a plurality of offers from the merchant entity, wherein each offer of the plurality of offers is based on at least the transmitted two or more offer parameters. The processing device is further configured to identify a specific offer of the received plurality of offers based on at least the offer data for the specific offer and the transaction data included in one or more transaction data entries included in the identified specific account profile. The transmitting device is further configured to transmit at least the offer data for the identified specific offer to the consumer entity.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

System for Facilitating Identification and Distribution of Offers

Figure 1A:
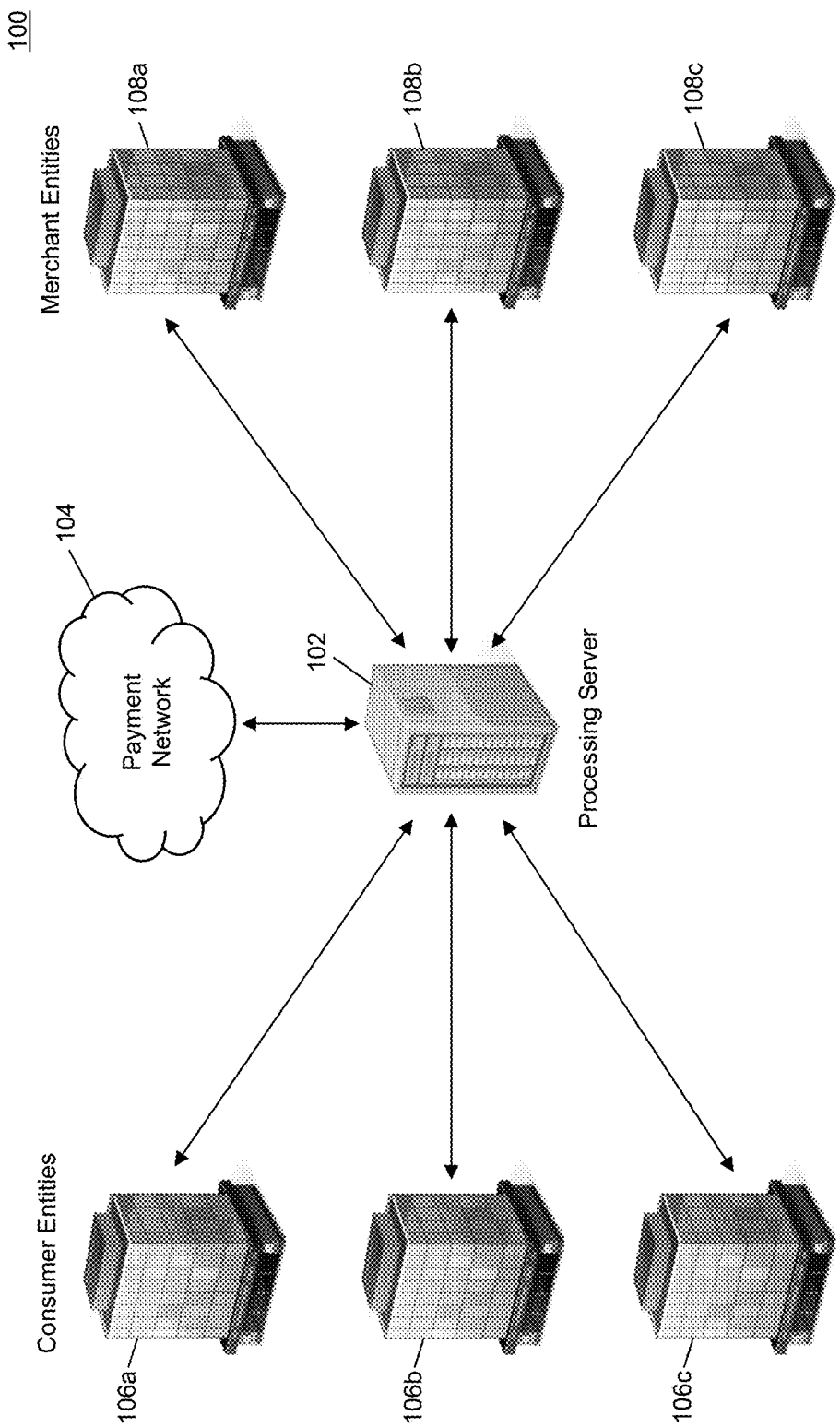
FIGS. 1A and 1B are high level architectures illustrating a system for identifying and distributing offers to a consumer in accordance with exemplary embodiments.
Figure 1B:
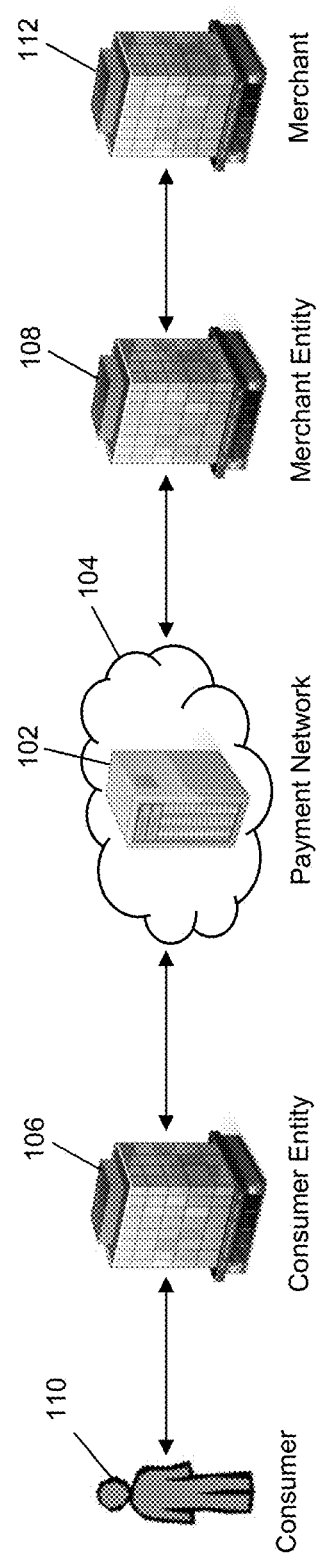

FIGS. 1A and 1B illustrate a system 100 for the facilitation of identification and distribution of offers to consumers based on consumer transaction data initiated by a triggering event.

The system 100 may include a processing server 102. The processing server 102, discussed in more detail below, may be configured to facilitate the identification of offers for distribution to a consumer based on transaction data. The processing server 102 may collect transaction data for a plurality of consumers from a payment network 104. The payment network 104 may be configured to process payment transactions and, as part of the processing of the payment transactions, may capture transaction data that is forwarded on to the processing server 102. The processing server 102 may receive the transaction data and may store the transaction data in profiles associated with transaction accounts involved in each payment transaction, as discussed in more detail below.

The system 100 may also include a plurality of consumer entities 106, illustrated in FIG. 1A as consumer entities 106a, 106b, and 106c. Each consumer entity 106 may be associated with one or more consumers and may be configured to distribute offers to the consumers. As part of the distribution of offers, a consumer entity 106 may identify a triggering event that involves a consumer, such as the consumer's arrival at a geographic location. For example, the consumer entity 106 may be a transportation service that identifies when a consumer is dropped off at a specific location, the consumer entity 106 may be a store, hotel, or other merchant that identifies when a consumer arrives at the premises, the consumer entity 106 may be an airline that identifies when a consumer arrives at a new city, etc.

The system 100 may also include a plurality of merchant entities 108, illustrated in FIG. 1A as merchant entities 108a, 108b, and 108c. Each merchant entity 108 may be associated with one or more merchants and may be configured to identify offers for the associated merchants that are to be distributed to consumers. As part of the identification of offers, a merchant entity 108 may receive offer parameters from the processing server 102, as discussed below, and may identify a plurality of offers based on the parameters. The plurality of offers may then be distributed to the processing server 102 for selection and eventual distribution to a consumer via the consumer entity 106. Merchant entities 108 may be any entity that collects offers from a plurality of merchants, such as an advertising agency, offer provider, content provider, retailer, merchant, manufacturer, review service, social network, etc.

As illustrated in FIG. 1B, a consumer entity 106 may identify a consumer 110 as part of a triggering event. For example, the consumer entity 106 may be a transportation service and the triggering event may be the delivery of the consumer 110 to their destination. Once the triggering event occurs, the consumer entity 106 may transmit information identifying the consumer 110 and a geographic location associated with the triggering event to the processing server 102. The information identifying the consumer 110 may include an identification number, transaction account number, username, e-mail address, phone number, device identifier, or other value suitable for identification that will be apparent to persons having skill in the relevant art.

The processing server 102 may identify transaction data associated with the consumer 110 based on the identifying information. As illustrated in FIG. 1B, in some embodiments the processing server 102 may be a part of the payment network 104 and may identify transaction data associated with the consumer 110 during regular processing of payment transactions. In other embodiments, the processing server 102 may regularly receive transaction data from the payment network 104, may request transaction data from the payment network 104 (e.g., upon receipt of consumer identifying information from the consumer entity 106), or may otherwise obtain transaction data from the payment network 104 using methods and systems that will be apparent to persons having skill in the relevant art.

In an exemplary embodiment, the processing server 102 may identify the transaction data anonymously such that the actual consumer 110 with whom the transaction data is associated is not personally identifiable. In one such exemplary embodiment, the consumer entity 106 may transmit an account identifier to the processing server 102 that is encrypted via a hash function or other one-way method of encryption. The processing server 102 may store transaction data for transaction accounts with the encrypted account identifiers such that the transaction data identified based thereon cannot be matched back to an actual transaction account, and thus cannot be personally identifiable to the associated consumer 110. In another embodiment, microsegments may be used by the processing server 102 such that transaction data for a microsegment of consumers that includes or could include the consumer 110 is identified, and is thus not personally identifiable to the actual consumer 110. Additional detail regarding microsegments and anonymization in the identification of transaction data is described in U.S. patent application Ser. No. 13/437,987, entitled "Protecting Privacy in Audience Creation," filed Apr. 3, 2012, by Curtis Villars et al.; U.S. patent application Ser. No. 13/721,216, entitled "Method and System for Assigning Spend Behaviors to Geographic Areas," filed Dec. 20, 2012, by Curtis Villars; U.S. Pat. No. 8,719,193, entitled "Systems and Methods for Analysis and Linkage Between Different Transaction Data Providers," issued May 6, 2014, by Marianne Iannace; and U.S. patent application Ser. No. 14/220,512, entitled "Systems and Methods for Analysis and Linkage Between Different Transaction Data Providers," filed Mar. 20, 2014, by Marianne Iannace, which are herein incorporated by reference in their entirety.

The processing server 102 may then identify a plurality of offer parameters for use in identifying an offer for the consumer 110. The offer parameters may be based on the geographic location provided by the consumer entity 106 and the transaction data associated with payment transactions involving the consumer 110. For instance, the offer parameters may include purchase behaviors of the consumer 110, such as the consumer's 110 propensity to spend for a plurality of categories, including merchants, industries, products, manufacturers, categories, and times. For example, the processing server 102 may identify that the consumer 110 has a high propensity to purchase coffee from coffee shops and has a high propensity to visit sandwich shops during lunchtime. In some embodiments, the offer parameters may include insights associated with the consumer 110, which may be based on the transaction data associated with payment transactions involving the consumer 110 and additional data, such as demographic data. Additional information regarding consumer insights and the identification thereof can be found in U.S. Provisional Patent Application No. 62/115,453, entitled "Method and System for Providing Insights to Merchants Based on Consumer Transaction History," filed Feb. 12, 2015, by Oran Cummins et al., which is herein incorporated by reference in its entirety.

The processing server 102 may transmit the parameters to the merchant entity 108. The merchant entity 108 may collect offers from one or more merchants 112. The merchant entity 108 may then identify a plurality of offers to distribute to the consumer 110 based on the received parameters. For instance, in the above example, the merchant entity 108 may identify offers from merchant coffee shops and sandwich shops near the geographic location where the consumer 110 was dropped off at by the transportation service. The merchant entity 108 may then transmit the identified offers to the processing server 102.

The processing server 102 may receive the offers and may identify an ideal offer for distribution to the consumer 110 based on details for each of the received offers and the transaction data associated with the consumer 110. In some instances, the processing server 102 may also base the determination on additional data associated with the consumer 110, such as data regarding past redemption or acceptance of offers by the consumer 110, demographic characteristics, consumer-provided preferences, etc. In the above example, the processing server 102 may identify that the consumer 110 would likely prefer an offer from a sandwich shop over a coffee shop at the time when the triggering event occurred, and would prefer an offer from a sandwich shop the consumer 110 already frequents over a new, unfamiliar merchant 112. The processing server 102 may then transmit the ideal, at least most likely offer to be accepted to the consumer entity 106 as determined by an analysis of past transactions, as explained below. In some instances, the processing server 102 may utilize consumer insights in the identification of an ideal offer for distribution to the consumer 110.

The consumer entity 106 may then distribute the offer to the consumer 110 using methods and systems that will be apparent to persons having skill in the relevant art. In the above example, the triggering event may occur at a predetermined period of time before the consumer 110 has arrived at their destination as known by the transportation service. The transportation service may then receive the offer prior to arrival and may present the offer to the consumer 110 once the destination has been reached. For example, the transportation service may provide the consumer 110 with the sandwich shop offer along with their receipt.

The methods and systems discussed herein may enable the processing server 102 to facilitate the identification and distribution of offers to consumers 110 quickly and efficiently using a unique system architecture that does not require modification to consumer entity 106 and merchant entity 108 systems. Consumer entities 106 and merchant entities 108 do not need to obtain any additional information than is currently known by each respective entity, but may still be able to distribute offers to consumers 110 with a high rate of effectiveness and efficiency. In addition, the processing server 102 may be further configured to provide convenient access to the systems and methods discussed herein, such as via an application programming interface, that may more easily enable a consumer entity 106 to provide triggering event information and receive offers, and for merchant entities 108 to receive offer parameters and submit offers. In such an instance, the speed and efficiency of the system 100 may be greatly increased, and the volume of offers identified and distributed by the consumer entity 106 and merchant entity 108 significantly expanded over the volume capable using traditional systems for offer distribution.

Processing Server

Figure 2:
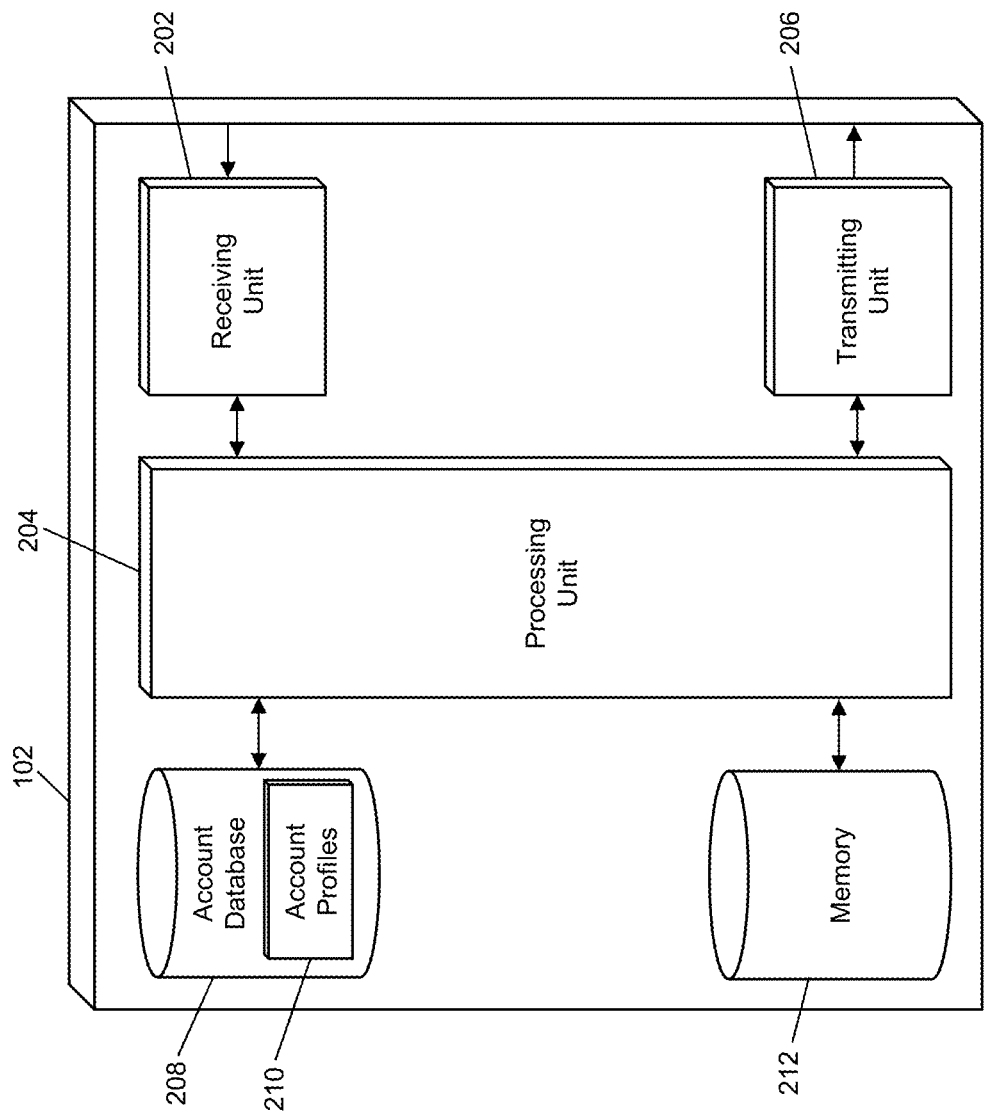
FIG. 2 is a block diagram illustrating the processing server 102 of FIG. 1 for the identification and distribution of offers in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 5 illustrated in FIG. 5 and discussed in more detail below may be a suitable configuration of the processing server 102.

The processing server 102 may include a receiving unit 202. The receiving unit 202 may be configured to receive data over one or more networks via one or more network protocols. The receiving unit 202 may receive transaction data from the payment network 104. The transaction data may be stored in an account database 208 of the processing server 102.

The account database 208 may include a plurality of account profiles 210. Each account profile 210 may include data related to a transaction account and include at least an account identifier and a plurality of transaction data entries. The account identifier may be a unique value suitable for identification of the related transaction account, the account profile 210, and/or a consumer 110 associated with the related transaction account. In some embodiments, the account identifier may be an encrypted account identifier that is not personally identifiable of the consumer 110 or related transaction account. In other embodiments, each account profile 210 may be related to transaction accounts associated with a microsegment of consumers 110. Each transaction data entry may include transaction data for a payment transaction involving the related transaction account. The transaction data may include a transaction amount, transaction time and/or date, geographic location, merchant data, product data, offer data, consumer data, point of sale data, etc.

The receiving unit 202 may also be configured to receive an offer request from a consumer entity 106. The offer request may include at least a geographic location and an account identifier associated with the consumer 110 for whom an offer is requested. The processing server 102 may include a processing unit 204, which may be configured to perform the functions of the processing server 102 discussed herein as will be apparent to persons having skill in the relevant art. The processing unit 204 may identify an account profile 210 in the account database 208 that corresponds to the consumer 110 that includes the account identifier included in the received offer request.

The processing unit 204 may be further configured to identify two or more parameters based on the geographic location included in the received offer request and the transaction data in the transaction data entries included in the identified account profile 210. As discussed above, the parameters may include purchase behaviors, consumer demographics, the geographic location, and other data suitable for use in the identification of offers by the merchant entity 108. In some embodiments, the parameters may also be based on previous offer acceptance and/or redemption history for the account profile 210.

The processing server 102 may also include a transmitting unit 206. The transmitting unit 206 may be configured to transmit data over one or more networks via one or more network protocols. The transmitting unit 206 may transmit the identified parameters to the merchant entity 108. In response, the receiving unit 202 may receive offer data for a plurality of offers from the merchant entity 108 that were identified based on the transmitted parameters. The offer data may include merchant data, product data, transaction modifiers, limitations on redemption, terms and conditions, names, descriptions, etc. for each of the offers.

The processing unit 204 may be further configured to identify a specific offer from the plurality of offers received from the merchant entity 108. The specific offer may be based on the offer data for each of the offers and at the transaction data and other data included in the account profile 210 corresponding to the consumer 110. In some embodiments, the specific offer may also be identified based on the geographic location included in the received offer request. The transmitting unit 206 may be configured to transmit the offer data for the specific offer to the consumer entity 106 once the specific offer has been identified.

The processing server 102 may also include a memory 212. The memory 212 may be configured to store memory suitable for performing the functions of the processing server 102 as discussed herein. For example, the memory 212 may store rules or algorithms suitable for identifying parameters, selecting an offer, calculating purchase behaviors, etc. Additional data that may be included in the memory 212 will be apparent to persons having skill in the relevant art.

In some embodiments, the receiving unit 202 may be configured to receive offer redemption data. The offer redemption data may be data associated with the redemption or lack thereof of an offer transmitted to the consumer entity 106 for a consumer 110. The processing unit 204 may store and/or update data in the account profile 210 corresponding to the consumer 110 based on the offer redemption data. For instance, the account profile 210 may include a history of offers and if each offer was redeemed or not redeemed, to be used in the identification of future offers. For example, the account profile 210 may indicate that the consumer 110 regularly fails to use offers for coffee shops, and thus the processing unit 204 may stop or decrease in the identification of coffee shop offers for distribution to the consumer 110.

In some instances, the processing server 102 may also provide an application programming interface to one or more entities, such as the consumer entities 106 and merchant entities 108, for use in communication with the processing server 102. The use of an application programming interface to communicate with a server will be apparent to persons having skill in the relevant art. By using the application programming interface, the receiving unit 202 and transmitting unit 206 may be able to quickly and efficiently provide communications to and/or from the entities, which may result in an overall increase in production and efficiency in the identification and distribution of parameters and offers by the processing server 102 using less computing processing and more efficient communications.

It will be apparent to persons having skill in the relevant art that the components of the processing server 102 illustrated in FIG. 2 and discussed herein may be further configured to perform additional functions, or that the processing server 102 may include additional and/or alternative components configured to perform the same and/or additional functions. For example, in embodiments where the processing server 102 is part of the payment network 104, the components of the processing server 102 may be further configured to process payment transactions for the payment network 104 using methods that will be apparent to persons having skill in the relevant art.

Process for Identifying and Distributing Offers

Figure 3:
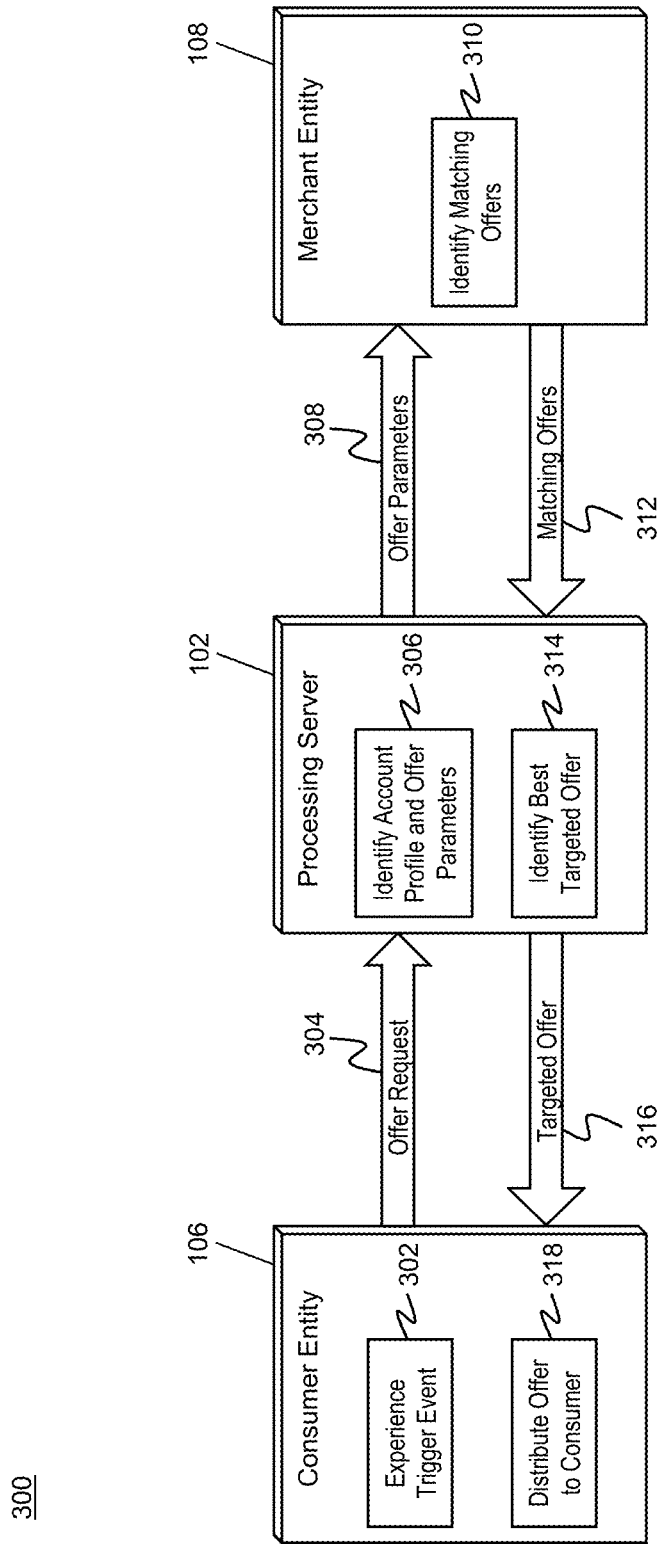
FIG. 3 is a flow diagram illustrating a process for identifying and distributing an offer to a consumer in accordance with exemplary embodiments.

FIG. 3 illustrates a process 300 for the identification and distribution of offers based on transaction data using the processing server 102 in the system 100 of FIG. 1.

In step 302, the consumer entity 106 may experience a trigger event. The trigger event may be the arrival of a consumer 110 at a specific geographic location. In one example, the consumer entity 106 may be a hotel, and the trigger event may be the checking-in of the consumer 110 at the hotel or checking in to a social network service via a social application on their smartphone, or being dropped off from a car service or the like, as just a few examples of being able to identify a particular consumer's location in association or linked to their payment account number or numbers that are known to the processing server 102. In step 304, the consumer entity 106 may transmit an offer request to the processing server 102, to be received by the receiving unit 202 of the processing server 102. The offer request may include at least a specific account identifier associated with a transaction account related to the consumer 110 and a geographic location. In some embodiments, the geographic location may be of the consumer entity 106. In other embodiments, the geographic location may be unrelated to the consumer entity 106. In the above example, the geographic location may be the location (e.g., street address, latitude and longitude, etc.) of the hotel.

In step 306, the processing unit 204 of the processing server 102 may identify a specific account profile 210 in the account database whose account identifier corresponds to the account identifier included in the received offer request. The processing unit 204 may also identify two or more offer parameters. The offer parameters may be based on at least the geographic location and the transaction data included in one or more transaction data entries included in the identified specific account profile 210. In the above example, the parameters may include the street address of the hotel, a high propensity to dine at Italian restaurants, a high propensity to purchase clothing, and a preferred traveling range of less than three miles for purchases, to name a few examples. Various offer selection techniques are disclosed in U.S. patent application Ser. No. 13/293,870 ("Method and Apparatus for Distributing Advertisements Using Social Networks and Financial Transaction"); Ser. No. 13/299,514 ("Method and System for Location- and History-Based Distribution of Offers to Mobile Devices"; Ser. No. 13/622,815 ("Method and System of Social Network Initiated Transactions and Rewards"); Ser. No. 13/793,616 ("Method and System for Offer Targeting Based on Offer Redemption"); and Ser. No. 13,774,116 ("System and Method for Facilitating Off-Peak Sales Using a Payment Card Network"), for instance, herein incorporated by reference.

In step 308, the transmitting unit 206 of the processing server 102 may transmit the identified two or more offer parameters to the merchant entity 108. In step 310, the merchant entity 108 may identify a plurality of offers based on the two or more parameters. In step 312, offer data for the matching offers may be transmitted to the processing server 102 and received by the receiving unit 202. In the above example, the matching offers may be for merchants 112 within three miles of the hotel and may include offers for two clothing stores and three Italian restaurants.

In step 314, the processing unit 204 of the processing server 102 may identify the best targeted offer for the consumer 110 based on the offer data for each of the matching offers and the transaction data included in the transaction data entries in the specific account profile 210. In the above example, the processing unit 204 may identify an offer for one of the Italian restaurants based on the time of day being a usual dining time for the consumer 110 and based on the strength of the offer being greater than the other two restaurant offers.

In step 316, the transmitting unit 206 of the processing server 102 may transmit the targeted offer to the consumer entity 106. In step 318, the consumer entity 106 may distribute the offer to the consumer 110 using methods that will be apparent to persons having skill in the relevant art. For instance, the offer may be distributed via e-mail, short message service message, multimedia message service message, telephone, an application program, a website, physical media, or any other suitable means. In the above example, the hotel may provide the consumer 110 with a physical voucher for the offer for the Italian restaurant.

Exemplary Method for Facilitating Identification and Distribution of Offers

Figure 4:
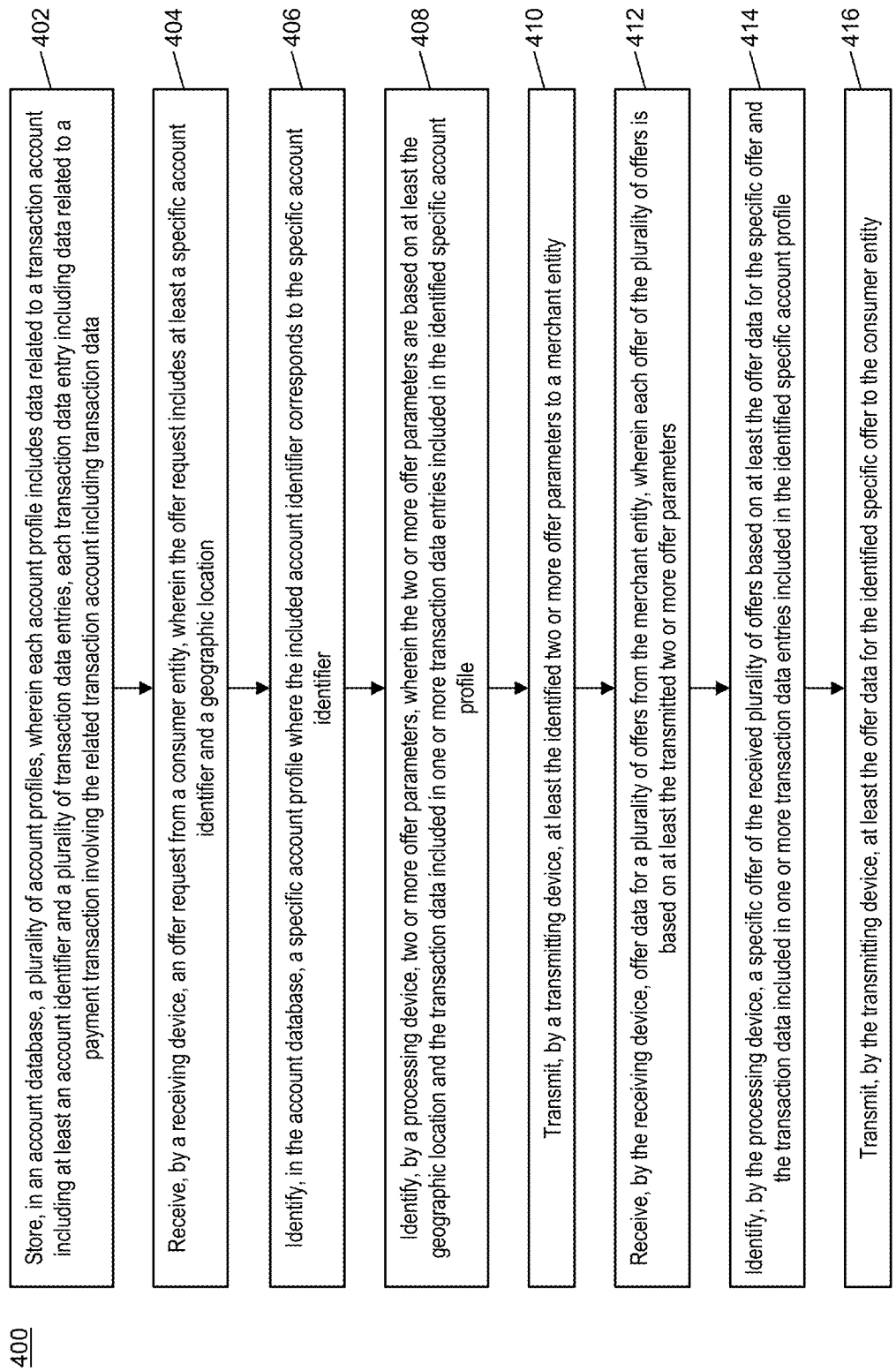
FIG. 4 is a flow chart illustrating an exemplary method for facilitating identification and distribution of offers in accordance with exemplary embodiments.

FIG. 4 illustrates a method 400 for facilitating the identification and distribution of offers based on transaction data.

In step 402, a plurality of account profiles (e.g., account profiles 210) may be stored in an account database (e.g., the account database 208), wherein each account profile 210 may include data related to a transaction account including at least an account identifier and a plurality of transaction data entries, each transaction data entry including data related to a payment transaction involving the related transaction account including transaction data. In step 404, an offer request may be received by a receiving device (e.g., the receiving unit 202) from a consumer entity (e.g., consumer entity 106), wherein the offer request includes at least a specific account identifier and a geographic location.

In step 406, a specific account profile 210 may be identified in the account database 208 where the included account identifier corresponds to the specific account identifier. In one embodiment, the offer request may be received after a trigger event identified by the consumer entity 106. In a further embodiment, the trigger event may include the arrival of a consumer (e.g., the consumer 110) associated with the transaction account related to the identified specific account profile 210.

In step 408, two or more offer parameters may be identified by a processing device (e.g., the processing unit 204), wherein the two or more offer parameters are based on at least the geographic location and the transaction data included in one or more transaction data entries included in the identified specific account profile 210. In step 410, at least the identified two or more offer parameters may be transmitted by a transmitting device (e.g., the transmitting unit 206) to a merchant entity (e.g., merchant entity 108).

In step 412, offer data for a plurality of offers may be received from the merchant entity 108 by the receiving device 202, wherein each offer of the plurality of offers is based on at least the transmitted two or more offer parameters. In some embodiments, the identified two or more offer parameters may be transmitted to a plurality of merchant entities 108, and the offer data for each offer of the plurality of offers may be received from at least one of the plurality of merchant entities 108. In one embodiment, the offer request and the offer data may be received via an application programming interface.

In step 414, a specific offer of the plurality of offers may be identified by the processing device 204 based on at least the offer data for the specific offer and the transaction data included in one or more transaction data entries included in the identified specific account profile 210. In step 416, at least the offer data for the identified specific offer may be transmitted by the transmitting device 206 to the consumer entity 106.

In one embodiment, each account profile 210 may further include a plurality of spend behaviors associated with the related transaction account, each spend behavior being based on the transaction data included in one or more transaction data entries included in the respective account profile 210. In a further embodiment, the method 400 may also include generating, by the processing device 204, the plurality of spend behaviors for the identified specific account profile 210 based on the transaction data included in one or more transaction data entries included in the identified specific account profile 210. In another further embodiment, the identified two or more offer parameters may be based on the plurality of spend behaviors included in the identified specific account profile 210.

In yet another further embodiment, the identified specific offer may be based on the plurality of spend behaviors included in the identified specific account profile 210. In another further embodiment, the method 400 may further include: receiving, by the receiving device 202, an indication of redemption of the specific offer; and updating, by the processing device 204, the plurality of spend behaviors included in the identified specific account profile 210 based on offer data for the specific offer.

Computer System Architecture

Figure 5:
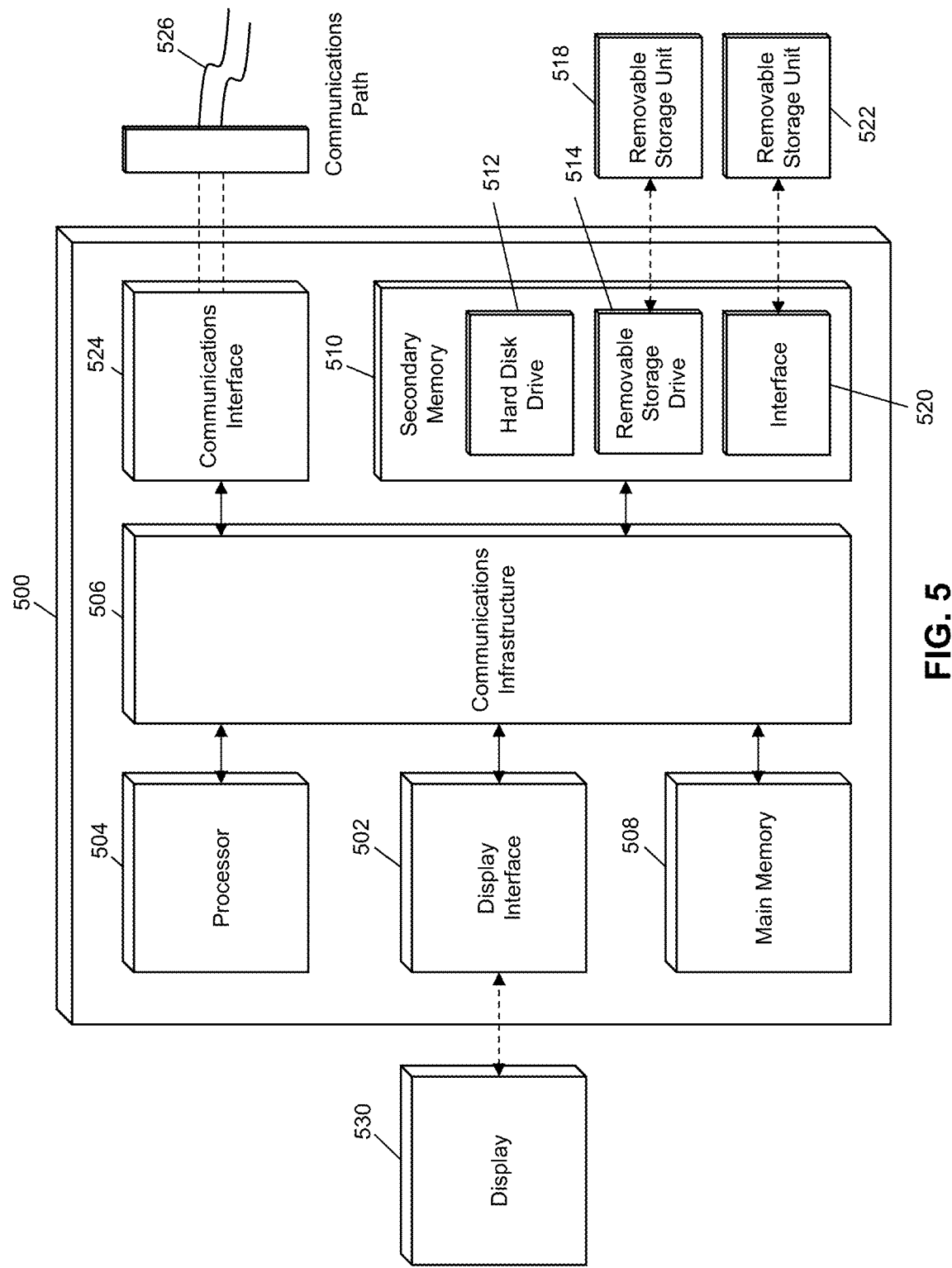
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

Techniques consistent with the present disclosure provide, among other features, systems and methods for facilitating identification and distribution of offers. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for facilitating identification and distribution of offers, comprising:
    providing, by a processing server, an application programming interface to a plurality of consumer entities and a plurality of merchant entities;
    in response to a triggering event with a consumer entity from the plurality of consumer entities, said triggering event involving an identification of a consumer by the consumer entity, receiving, by a receiving device of the processing server, an offer request via an application programming interface of the consumer entity of the plurality of consumer entities, wherein the offer request includes at least a specific account identifier and a geographic location;
    identifying, in an account database of the processing server, a specific account profile where an account identifier included in the specific account profile corresponds to the specific account identifier included in the received offer request;
    identifying, by a processing device of the processing server, two or more offer parameters based on at least the geographic location and transaction data, wherein said transaction data is (i) received, by the processing server, by a payment network, and (ii) included in one or more transaction data entries included in the identified specific account profile;
    transmitting, by a transmitting device of the processing server, at least the identified two or more offer parameters to a merchant entity associated with a plurality of merchants;
    receiving, by the receiving device of the processing server, offer data for a plurality of offers via an application programming interface of the merchant entity of the plurality of merchant entities, wherein each offer of the plurality of offers is based on at least the transmitted two or more offer parameters; and
    transmitting, by the transmitting device of the processing server, at least the offer data for the identified specific offer to the consumer entity, via the application programming interface of the consumer entity, for distribution to the consumer, wherein said specific offer is based on at least the transaction data, received from the payment network and a time at which the triggering event occurred.

2. The method of claim 1, wherein each account profile further includes a plurality of spend behaviors associated with the related transaction account, each spend behavior being based on the transaction data included in one or more transaction data entries included in the respective account profile.

3. The method of claim 2, further comprising:
    generating, by the processing device, the plurality of spend behaviors for the identified specific account profile based on the transaction data included in one or more transaction data entries included in the identified specific account profile.

4. The method of claim 2, wherein the identified two or more offer parameters are based on the plurality of spend behaviors included in the identified specific account profile.

5. The method of claim 2, wherein the identified specific offer is based on the plurality of spend behaviors included in the identified specific account profile.

6. The method of claim 2, further comprising:
    receiving, by the receiving device, an indication of redemption of the specific offer; and
    updating, by the processing device, the plurality of spend behaviors included in the identified specific account profile based on offer data for the specific offer.

7. The method of claim 1, wherein the trigger event includes arrival of the consumer associated with the transaction account related to the identified specific account profile at the geographic location.

8. The method of claim 1, wherein
    the identified two or more offer parameters are transmitted to a plurality of merchant entities, and
    the offer data for each offer of the plurality of offers is received from at least one merchant entity of the plurality of merchant entities.

9. A system for facilitating identification and distribution of offers, comprising:
    a receiving device, of a processing server, configured to receive, from a payment network, a plurality of transaction data related to payment transactions for a plurality of consumers;
    a processing device of the processing server; and
    a transmitting device of the processing server, wherein
        in response to a triggering event with a consumer entity from the plurality of consumer entities, said triggering event involving an identification of a consumer by the consumer entity, the receiving device is configured to receive an offer request from the consumer entity of the plurality of consumer entities, wherein the offer request includes at least a specific account identifier and a geographic location;
        the processing device is configured to
            identify, in an account database, a specific account profile where an account identifier included in the specific account profile corresponds to the specific account identifier in the received offer request, and
            identify two or more offer parameters based on at least the geographic location and the transaction data, wherein said transaction data is (i) received, by the processing server, by a payment network, and (ii) included in one or more transaction data entries included in the identified specific account profile, the transmitting device is configured to transmit at least the identified two or more offer parameters to a merchant entity associated with a plurality of merchants, the receiving device is further configured to receive offer data for a plurality of offers from a merchant entity, wherein each offer of the plurality of offers is based on at least the transmitted two or more offer parameters, and the transmitting device is further configured to transmit at least the offer data for the identified specific offer to the consumer entity for distribution to the consumer, wherein said specific offer is based on at least the transaction data, received from the payment network and a time at which the triggering event occurred.

10. The system of claim 9, wherein each account profile further includes a plurality of spend behaviors associated with the related transaction account, each spend behavior being based on the transaction data included in one or more transaction data entries included in the respective account profile.

11. The system of claim 10, wherein the processing device is further configured to generate the plurality of spend behaviors for the identified specific account profile based on the transaction data included in one or more transaction data entries included in the identified specific account profile.

12. The system of claim 10, wherein the identified two or more offer parameters are based on the plurality of spend behaviors included in the identified specific account profile.

13. The system of claim 10, wherein the identified specific offer is based on the plurality of spend behaviors included in the identified specific account profile.

14. The system of claim 10, wherein the receiving device is further configured to receive an indication of redemption of the specific offer, and the processing device is further configured to update the plurality of spend behaviors included in the identified specific account profile based on offer data for the specific offer.

15. The system of claim 9, wherein the trigger event includes arrival of the consumer associated with the transaction account related to the identified specific account profile at the geographic location.

16. The system of claim 9, wherein the identified two or more offer parameters are transmitted to a plurality of merchant entities, and the offer data for each offer of the plurality of offers is received from at least one merchant entity of the plurality of merchant entities.

17. The system of claim 9, wherein the offer request and the offer data for the plurality of offers are received by the receiving device via an application programming interface.

* * * * *